H. J. MEEKS & R. S. HARRIS.
ANIMAL HOPPLE.
APPLICATION FILED AUG. 1, 1907. RENEWED NOV. 12, 1908.
914,059.
Patented Mar. 2, 1909.
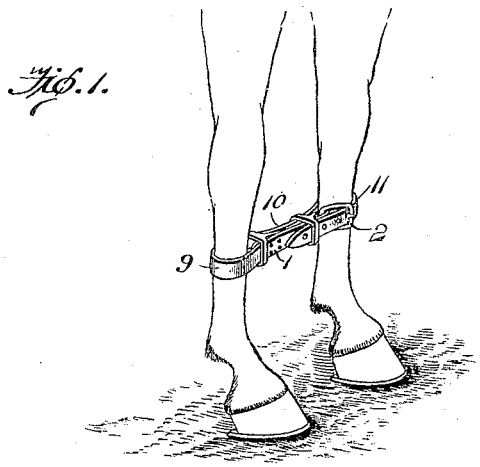
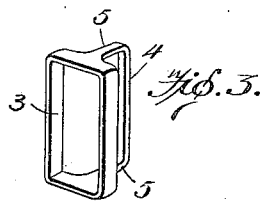
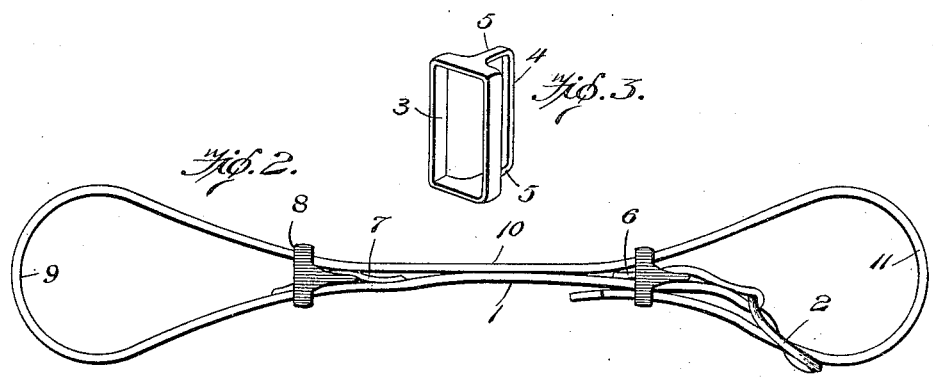

UNITED STATES PATENT OFFICE.

HEBER J. MEEKS, OF ORDERVILLE, AND ROY S. HARRIS, OF LEEDS, UTAH.

ANIMAL-HOPPLE.

No. 914,059.  Specification of Letters Patent.  Patented March 2, 1909.

Application filed August 1, 1907, Serial No. 386,543. Renewed November 12, 1908. Serial No. 462,348.

*To all whom it may concern:*

Be it known that we, HEBER J. MEEKS and ROY S. HARRIS, citizens of the United States, residing at Orderville and Leeds, in the counties of Kane and Washington and State of Utah, have invented certain new and useful Improvements in Animal - Hopples, of which the following is a specification.

Our invention relates to improvements in animal hopples, and has for its object, the provision of a simple and durable construction of hopple which will be useful for a variety of purposes, such as for a halter, as a tie for holding animals while branding, and which will perform all the functions of a hopple in a thoroughly efficient and practical manner.

Another object of our invention is the provision of a hopple of light and compact form, which will not injure the animal to which it is applied, which may be easily manipulated, and which will securely tie the animal.

With the above objects in view, our invention consists of a hopple made of one continuous strap, in providing an adjustable connection for the ends of the strap, and in mounting keepers on the strap which form loops at each end of the hopple.

The invention further consists of a hopple embodying certain other novel features of construction and combination of parts, substantially as herein disclosed.

Figure 1, is a perspective view of our improved hopple as in position upon a horse's fore legs. Fig. 2, is a plan or edge view of the complete hopple, and Fig. 3, is a detail perspective view of one of the keepers used upon the hopple.

In the accompanying drawings: The numeral 1, designates the strap which forms the body of the hopple, upon one end of which is secured the buckle 2, the other end of the strap having openings therein through which the tongue of the buckle is adapted to pass.

We use a peculiar form of keeper or harness loop in connection with the hopple, which is clearly illustrated in Fig. 3. This keeper comprises a rectangular loop 3, and a parallel connecting bar 4 extends midway across the loop and is offset from the loop by the angular end portions 5. Two of these keepers are used upon the hopple, one of them being mounted upon the strap near the buckle end thereof, the end of the strap after passing through the buckle, being brought back and riveted over the connecting or securing bar of the keeper at 6. The other keeper is located upon the same or main portion of the strap at a short distance from the first mentioned keeper (about five inches in ordinary use), and is held upon the strap by a short securing strap or plate 7, which is riveted over the connecting bar of the keeper as before described. The keepers are thus looped upon the main portion of the strap, and the strap is doubled back through the keeper farthest from the buckle at 8, thereby providing the loop 9, thence continued parallel to or resting upon the main portion of the strap at 10, through one side of the first keeper and to the buckle to form the loop 11, and after passing through the buckle, the free end of the strap is confined in the opposite side of the first keeper, or if the strap be long enough, the free end is confined in the corresponding side of the second keeper.

By means of the buckle connection, the size of the hopple loops may be adjusted at will, and the hopple may be used as a halter to be put about the animal's neck, by withdrawing the free end of the strap from the keepers and using it independent of the keepers. In tying animals for branding or for other purposes, the free end of the strap may be withdrawn from the keepers and the strap passed around the animal's legs as many times as required.

From the foregoing description taken in connection with the drawings, it will be apparent that we have provided a useful and desirable animal hopple and one which accomplishes all the objects herein set forth.

We claim:

An animal hopple comprising a continuous strap doubled upon itself to form end loops, a buckle securing the ends of the strap, keepers for maintaining the loops on the strap, said keepers each comprising a rectangular loop having a securing bar offset from the central portion of the loop, the end of the strap being passed through the buckle for securing the same in place, thence brought back over the securing bar of one of the keepers to secure such keeper in place, and a short securing strap passed over the securing bar of the other keeper and fastened to the main portion of the strap for securing said keeper in position, the sides of the doubled strap being passed through the loop on each side of the securing bar.

In testimony whereof we affix our signatures, in presence of two witnesses.

HEBER J. MEEKS.
ROY S. HARRIS.

Witnesses:
J. A. CRECELIUS,
MARY E. CRECELIUS.